3,123,522
CARBOXYLIC ESTER PESTICIDES

Otto Scherer and Karl Reichner, Frankfurt am Main, and Ludwig Friedrich Emmel, Bergen-Enkheim, Germany, assignors to Farbwerke Hoechst Aktiengesellschaft vormals Meister Lucius & Brüning, Frankfurt am Main, Germany, a corporation of Germany
No Drawing. Filed Feb. 16, 1960, Ser. No. 8,913
Claims priority, application Germany July 13, 1957
19 Claims. (Cl. 167—30)

This invention relates to pesticides having excellent acaricidal and ovicidal activity.

This application is a continuation in part of our copending application Serial Number 735,938, filed May 19, 1958, now abandoned.

One object of the present invention is to provide carboxylic acid esters of 4,6-dinitro-2-sec.-butylphenol and their application in the form of solid or liquid pesticidal preparations.

Another object of the invention is to provide an agent for successfully combating the red spider in any stage of its development.

Nitrated phenols have long been used as insecticides for winter spraying but they could not be used for summer spraying because they destroy plants to such an extent that those compounds have even been used as herbicides.

The esterification of these nitrated phenols merely diminishes this disadvantage but does not remove it. Thus, for instance, the acetates, benzoates and chloracetates of nitrated phenols and also esters of halogen-nitro-alkylphenols have been described as effective insecticides. However, they did not exhibit the required inertness towards the plant organism because when they are applied at amounts at which they do not yet injure the plants, they have no activity on spider mites.

Some of these esters and their action are listed in the following Table I. The activity was examined 8 days after the treatment, the test plant being *Phaseolus vulgaris*.

TABLE I

| Compound | Concentration, percent | Activity against spider mites |
|---|---|---|
| 2,6-dinitro-4-chlorophenyl acetate | 0.5 | none |
| 2-bromo-4-chloro-6-nitro-phenyl acetate | 0.5 | none |
| 4,6-dinitro-2-isopropylphenyl benzoate | 0.5 | none |
| 2-bromo-4-tert.-butyl-6-nitro-phenyl benzoate | 0.5 | none |
| 4,6-dinitro-2-cyclohexyl-phenyl benzoate | 0.5 | none |
| 4,6-dinitro-2-sec.-hexyl-phenyl benzoate | 0.5 | none |

Among those esters the crotonic acid esters of 2,4-dinitroalkylphenols, the alkyl radicals of which contain 6–9 C-atoms, make a certain exception. Having a relatively low phytotoxicity, they are effective as insecticides and fungicides, but not as acaricides and ovicides. In Table II are given the results of comparative tests of the activity of the esters of 4,6-dinitro-2-sec.-butyl-phenol according to this invention and the crotonic acid esters of 4,6-dinitro-2n-octylphenols on *Tetranychus urticae* on Phaseolus.

TABLE II

| Active compound | Concentration, percent | Control after— | |
|---|---|---|---|
| | | 3 days, percent dead | 8 days, percent dead |
| Dimethylacrylic acid ester of the 4,6-dinitro-2-sec.-butyl phenol | 0.1 | 100 | 100 |
| | 0.05 | 100 | 100 |
| | 0.025 | 91 | 99 |
| Benzoic acid ester of the 4,6-dinitro-2-sec.-butylphenol | 0.1 | 92 | 100 |
| | 0.05 | 94 | 97 |
| Crotonic acid ester of the 4,6-dinitro-2n-octyl-phenol | 0.12 | 46 | 64 |
| | 0.05 | 12 | 3 |
| | 0.025 | without activity | |

The tabulated data clearly show the superiority of the esters of 4,6-dinitro-2-sec.-butylphenol over the crotonic acid ester of 4,6-dinitro-2n-octylphenol.

According to U.S. Patent 2,861,915 the pentene-4-acid ester of 4,6-dinitro-2-phenylphenol and of 4,6-dinitro-2-cyclohexylphenol in concentrations of 1:6,400 are said to be capable of destroying 95 or 100% of mites of *Tetranychus bimaculatus* on bean plants. Our tests proved, however, that the mentioned esters are completely inactive when applied at comparable quantities (0.025 and 0.012% of active substance).

Gertler et al. state in Entomology Research Branch Bull. E-877, pages 1–7, May 1954, U.S. Dept. of Agr., Agr. Research Service, that the butyric acid ester of 4,6-dinitro-2-methylphenol is effective against spider mites. At quantities, however, at which the ester secures total destruction of the mites it simultaneously injures the plants so seriously, that it cannot be used in practice.

According to King (U.S. Dept. Agr. Handbook No. 69, pages 1–18, 123 and 259–260) it is known that the acetic acid- and benzoic acid esters of 4,6-dinitro-2-cyclohexylphenol have insecticidal properties. However, the mentioned esters exhibit no acaricidal or ovicidal action (cf. Table III).

Furthermore, there are also known salts of alkylated 4,6-dinitro-phenols that exhibit insecticidal, fungicidal and partly acaricidal activity; however, these salts cause yellow coloration of the plants and of the operators handling them. In this connection, the fact is particularly noteworthy that according to Coleman et al. (U.S. Patent 2,369,137) the mono-salts from 4,4'-diamino-diphenylmethane and 4,6-dinitro-2-sec.-butylphenol or 4,6-dinitro-2-cyclohexylphenol show almost the same activity, from which fact the insecticidal equivalency of the sec.-butyl radical and the cyclohexyl radical might be deduced. However, this equivalency does not exist as results from the data given in Table III; this table compares the activity of the benzoic acid ester of 4,6-dinitro-2-sec.-butylphenol and the 4,6-dinitro-2-cyclohexylphenol against spider mites.

TABLE III

| Active compound | Concentration, percent | Control after— | |
|---|---|---|---|
| | | 3 days | 8 days |
| | | Percent of mites killed | |
| Benzoic acid ester of the 4,6-dinitro-2-cyclohexylphenol | 0.5 | 0 | 0 |
| | 0.25 | 0 | 0 |
| Benzoic acid ester of the 4,6-dinitro-sec.-butylphenol | 0.5 | 100 | 100 |
| | 0.25 | 100 | 100 |

Now, we have found that the esters of the general formulae

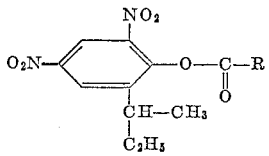

and

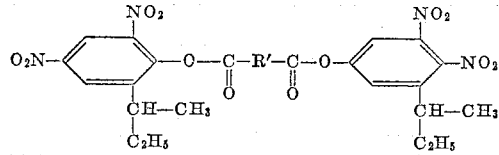

in which R stands for a monovalent radical selected from the group consisting of saturated, unsaturated and halogen-substituted aliphatic radicals, saturated, unsaturated and halogen-substituted cycloaliphatic radicals, alkoxy radicals having 1 to 4 C-atoms, and the phenyl radical, and R' represents a bi-valent radical selected from the group consisting of aliphatic radicals and the phenyl radical, in addition to possessing an excellent insecticidal, acaricidal and ovicidal activity are highly inert towards plants and possess a very low toxicity towards warm-blooded animals.

Their most important property is that they kill the eggs, for example, of the red spider which is at the present time a serious pest attacking almost all cultivations. Heretofore it has not been possible to successfully combat both the imagos and the eggs with a single agent. It has been necessary to kill the mites by repeated spraying as they develop. With the compounds of the present invention that disadvantage is overcome.

The superiority of the esters of 4,6-dinitro-2-sec.-butylphenol (DNBP) of the present invention over the analogous esters of 4,6-dinitro-2-methylphenol (DNMP) can be seen from the data given in Table IV.

TABLE IV

| Active compound | Concentration, percent | Action on spider mites, evaluation after 8 days | Injury to plants |
| --- | --- | --- | --- |
| 1. Acetic acid ester of DNBP. | 0.025 | 100% destruction of the | none. |
|  | 0.006 | do | Do. |
| 2. Acetic acid ester of DNMP. | 0.025 | development of the population. | strong. |
| 3. Chloracetic acid ester of DNBP. | 0.025 | 100% destruction of the population. | slight. |
|  | 0.01 | do | none. |
| 4. Chloracetic acid ester of DNMP. | 0.025 | do | tips of leaves are burnt. |
| 5. Propionic acid ester of DNBP. | 0.025 | do | none. |
|  | 0.012 | 98% destruction of the population. | Do. |
| 6. Propionic acid ester of DNMP. | 0.025 | No action | slight. |
|  | 0.012 | do | Do. |
| 7. Butyric acid ester of DNBP. | 0.025 | 100% destruction of the population. | Do. |
| 8. Butyric acid ester of DNMP. | 0.025 | do | total. |
| 9. Dimethylarylic acid ester of DNBP. | 0.012 | do | none. |
|  | 0.006 | do | Do. |
| 10. Dimethylacryic acid ester of DNMP. | 0.05 | no action | Do. |
| 11. Lauric acid ester of DNBP. | 0.05 | 77 larv.-imagines | 100 (Ny-imag.). |
|  | 0.025 | 62 larv. imagines | 100 (Ny-imag.). |
| 12. Lauric acid ester of DNMP. | 0.05 | No action |  |
|  | 0.025 | do |  |
| 13. Benzoic acid ester DNBP. | 0.025 | 100% destruction of the population. | none |
|  | 0.01 | do | Do. |
| 14. Benzoic acid ester of DNMP. | 0.025 | 54% destruction of the population. | Do. |
| 15. Hexachlorendomethylenetetrahydro-acid ester of DNBP. | 0.05 | 100% destruction of the population. | Do. |
|  | 0.025 | 90% destruction of the population. | Do. |
| 16. Hexachlorendomethylenetetrahydro-benzoic acid ester of DNMP. | 0.05 | No action | Do. |
|  | 0.025 | do | Do. |

At concentrations at which 4,6-dinitro-2-methylphenol esters still distinctly "burn" the plants they already are no longer sufficiently active, i.e. they neither exhibit a sufficient ovicidal action nor a permanent action and are, moreover, not fully effective against mobile or immobile stages of development of the pests. The benzoic acid ester of 4,6-dinitro-2-methylphenol is not phytotoxic, but it exhibits on the other hand weak action only.

In contradistinction thereto, the products of the present invention are not phytotoxic at all and permit the complete destruction of the population of spider mites with comparable or also lower concentrations of active substance.

The above compounds can be prepared, for example, according to the following reaction schemes:

(1)
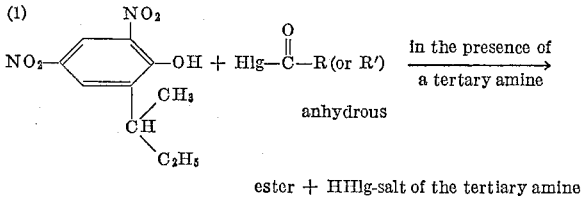

ester + HHlg-salt of the tertiary amine

Hlg=Cl; Br (2)
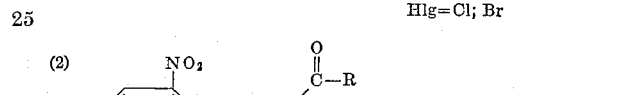

(3)
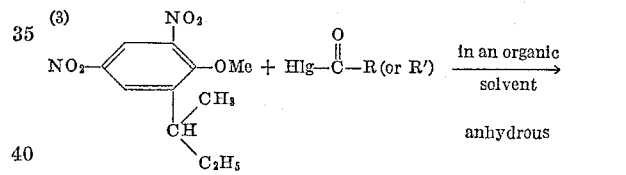

ester + MeHlg

Me=metal (e.g. Na, K, Mg, Ca)

The reaction is suitably carried out by dissolving a 4,6-dinitro-2-sec.-butylphenol and a carboxylic acid halide at molar proportion in an inert organic solvent, for example, benzene or carbon tetrachloride and adding in the course of about 15 to 30 minutes a quantity slightly exceeding the calculated quantity of a tertiary amine, for example, pyridine or dimethylaniline, and so adjusting the rate of feed of the latter that, due to the exothermic reaction, the boiling temperature is reached.

Boiling under reflux is continued for one to two hours and the whole is then cooled, and, after introduction into a separating vessel, there is added water and additional hydrochloric acid; the mixture is then so often washed with this acid solution until all of the tertiary amine is dissolved out, and subsequently, it is so often washed with solutions that are alkaline with soda until all of the acid components are removed, and finally it is washed to neutral with water.

The solvent is then completely removed under reduced pressure. There are obtained in this manner esters that are technically pure and can be applied in formulated form without ado. In case they form solid substances, they can be easily purified by recrystallization. The liquid esters, however, cannot be purified by distillation under reduced pressure due to the fact that they decompose.

It is also possible to introduce first the 4,6-dinitro-2-sec.-butylphenol and a tertiary amine into an inert organic solvent and then to feed in the acid chloride.

The esters so obtained are either yellowish to brownish, neutral oils, which cannot be distilled without decomposition and are partly of viscous consistency, or they are white to slightly yellowish crystalline, neutral substances. More particularly, they are described in the following Table V.

TABLE V

*Esters of the 4,6-Dinitro-2-Sec.-Butylphenol*

| Acid component | Melting point, °C. | Analysis | |
|---|---|---|---|
| | | Calculated, percent N/ (percent Cl) | Found, percent N/ (percent Cl) |
| Acetic acid | liquid | 9.93 | 10.1 |
| Chloracetic acid | 54–56 | (11.23 Cl) | (11.35 Cl) |
| Propionic acid | liquid | 9.48 | 9.45 |
| Butyric acid | liquid | 9.03 | 8.85 |
| Trimethylacetic acid | 50–52 | 8.65 | 8.45 |
| Isobutyric acid | liquid | 9.03 | 9.15 |
| β,β-Dimethylacrylic acid | 67–69 | 8.7 | 8.6 |
| β,β-Methyl-n-propylacrylic acid | liquid | 8.0 | 8.1 |
| Sorbic acid | 86–87 | 8.75 | 8.42 |
| Oleic acid | liquid | 5.55 | 5.75 |
| Lauric acid | liquid | 6.65 | 6.45 |
| Adipic acid | 63–66 | 8.65 | 8.65 |
| Benzoic acid | 76–78 | 8.14 | 8.2 |
| Hexahydrobenzoic acid | 71.5–73 | 8.0 | 8.1 |
| o-Phthalic acid | 146–147 | 9.19 | 9.16 |
| Hexachlorendomethylenetetra-hydrobenzoic acid | liquid | (36.9 Cl) | (35.7 Cl) |

The compounds of the invention are the esters of 2-sec.-butyl-4,6-dinitro-phenol with, for example, aliphatic or cycloaliphatic saturated or unsaturated acids, having short or long, branched or unbranched chains, and also halogen, alkoxy and aryloxy substitution products thereof, for example, acetic acid, methoxy acetic acid, cinnamic acid, chloracetic acid, phenylacetic acid, phenyloxyacetic acid, sorbic acid, stearic acid, acrylic acid, methacrylic acid, β,β-dimethylacrylic acid, β,β-methyl-n-propyl-acrylic acid, trimethylacetic acid, further hexahydrobenzoic acid, tetrahydrobenzoic acid, hexachlorendomethylenetetrahydrobenzoic acid, oleic acid and dibasic aliphatic acids such as adipic acid, further, aromatic mono- and di-carboxylic acids, for example, benzoic acid, phthalic acid and the derivatives thereof containing one or more substituents of the same or different kind containing, for example, halogen, alkyl, nitro, hydroxy and alkoxy groups, for example, 2,4-dichlorobenzoic acid, 3- or 4-nitrobenzoic acid, 2-nitro-4-chloro-benzoic acid, 2-chloro-5-methyl-benzoic acid, 2-hydroxy-benzoic acid or 2-methoxy-benzoic acid.

The compounds are applied in the usual formulations as spraying or dusting preparations with inert materials, for instance, kaolin, talcum or kieselguhr, solvents, pulverulent emulsifiers etc., if desired also in admixture with other insecticides, acaricides, fungicides or ovicides.

The following examples serve to illustrate the invention but they are not intended to limit it thereto:

EXAMPLE 1

Spider mites can easily be combated with the sorbic acid ester of 4,6-dinitro-2-sec.-butyl-phenol (melting at 86–87° C.). When bean plants infested with spider mites (Tetranychidae) are sprayed with an aqueous liquor of 0.2% strength of an emulsifiable concentrate containing 15% of the aforesaid sorbic acid ester, 75% of cyclohexanone and 10% of polyoxethylated nonylphenol as emulsifier, all the spider mites are dead within 1 hour. The greater part of the eggs is likewise destroyed. Those larvae that subsequently hatch out soon die after coming into contact with the residual substance on the various parts of the plant.

EXAMPLE 2

The ester described in Example 1 also kills mites of the genus Tarsonemus, when it is applied in the same manner and at the same concentration.

EXAMPLE 3

A spraying liquor of 0.25% strength of the concentrate described in Example 1 is well suitable for combating caterpillars of the brown tail moth (*Euproctis chrysorrhea*).

EXAMPLE 4

Bean plants infested with spider mites are sprayed with an aqueous liquor of 0.2% strength of an emulsifiable concentrate containing 15% of the benzoic acid ester of 4,6-dinitro-2-sec.-butyl-phenol (melting at 72–73° C.), 75% of cyclohexanone and 10% of polyoxethylated nonylphenol as emulsifier. The mites and also the greater part of the eggs are destroyed. The larvae that subsequently hatch out soon die after coming into contact with the substance adhering to various parts of the plant.

EXAMPLE 5

Tests in Petri dishes with the liquid oily acetic acid ester of 4,6-dinitro-sec.-butyl-phenol showed it to be effective against flies (*Musca domestica*). 1 cc. of a solution of 0.1% of the ester in acetone was poured into each half of a dish and the acetone was allowed to evaporate. The flies inserted are permanently on their backs within one hour. The activity lasts for several weeks.

EXAMPLE 6

A spraying liquor having the composition described in Example 1 except that it contained the o-phthalic acid diester of 4,6-dinitro-2-sec.-butyl-phenol (melting at 146–147° C.) instead of the said benzoic acid ester is also suitable for killing the caterpillars of the brown tail moth (*Euproctis chrysorrhea*) when applied at a concentration of 0.25%.

EXAMPLE 7

The agent described in Example 1, when applied at the same concentration, also kills mites of the genus Tarsonemus.

EXAMPLE 8

An emulsifiable spraying preparation consisting of 25% of the oleic acid ester of 4,6-dinitro-2-sec.-butylphenol, 30% of butanol, 30% of xylene and 15% of polyoxethylated nonylphenol, when applied at a concentration of 1.2% kills all the young caterpillars of the gypsy moth (*Limantria dispar*) within 24 hours.

EXAMPLE 9

As dusting preparation consisting of 5% of the benzoic acid ester of 4,6-dinitro-2-sec.-butylphenol (melting at 73° C.) and 95% of talcum is very suitable for combating the red spider in all stages of development.

EXAMPLE 10

A dusting preparation is prepared by spraying 5% of the oleic acid ester of 4,6-dinitro-sec.-butylphenol on 15% of bentonite, while stirring and moderately heating (60–70° C.) the mixture and the resulting concentrate of the active substance is extended with 80% of talcum.

EXAMPLE 11

A powdered spraying preparation is prepared by mixing together 40% of the oleic acid ester of 4,6-dinitro-sec.-butyl, 40% of finely dispersed $SiO_2$, 15% of cellulose pitch (sodium salt of sulfite cellulose waste liquor) and 5% of the sodium salt of oleic acid methyl-tauride. This preparation is well suitable for killing the caterpillars of the brown tail moth (*Euproctis chrysorrhea*).

EXAMPLE 12

Tradescantia plants infested with thrips are sprayed with an aqueous liquor of 1% strength of an emulsifiable concentrate containing 25% of benzoic acid ester of 4,6-dinitro-2-sec.-butylphenol, 65% of cyclohexanone and 10% of polyoxethylated nonylphenol, and the larvae as well as the imagines are destroyed.

EXAMPLE 13

Gooseberry mites (*Bryobia pretiosa*) on gooseberry plants are completely destroyed by spraying the plants with an aqueous liquor of 0.1% strength of the emulsifiable concentrate having the composition given in Example 12.

EXAMPLE 14

When bean plants that are heavily infested with spider mites (*Tetranychus urticae*) are sprayed with spraying liquor of 0.025% strength of a concentrate containing 25% of dimethylacrylic acid ester of 4,6-dinitro-2-sec. butyl-phenol, 64% of amorphous silicic acid, 10% of cellulose pitch (calcium salt of lignine sulfonic acid) and 1% of the sodium salt of oleic acid methyl-tauride, all the spider mites in all stages of their development including the eggs are destroyed.

EXAMPLE 15

All plant-lice (*Cerosipha gossypii*) on chrysanthemums are destroyed when the plants are sprayed with a spraying liquid of 0.1% strength of an emulsifiable concentrate containing 25% of the dimethylacrylic acid ester of 4,6-dinitro-2-sec.-buty-phenol, 30% of butanol, 30% of xylol and 15% of an alkylphenol polyglycol ether.

EXAMPLE 16

A spraying agent having the composition described in Example 15 except that it contains the hexahydrobenzoic acid ester of 4,6-dinitro-2-sec.-butylphenol instead of the dimethylacrylic acid ester, applied at a concentration of 0.05%, is likewise very suitable for combating spider mites in any stage of development.

EXAMPLE 17

A spraying agent having the composition described in Example 14 except that it contains the β-methyl-β-n-propylacrylic acid ester of 4,6-dinitro-2-sec.-butyl-phenol instead of the dimethylacrylic acid ester, applied at a concentration of 0.05% is very suitable for combating spider mites in every stage of development.

EXAMPLE 18

When test plants infested with scales (Lecaniinae), for example, *Lecanium hesperidum*) are sprayed with a liquor of 0.4% strength of a concentrate containing 25% of isobutyric acid ester of 4,6-dinitro-2-sec.-butyl-phenol, 64% of amorphous silicic acid, 10% of cellulose pitch (calcium salt of lignine sulfonic acid) and 1% of the sodium salt of oleic acid methyl-tauride, the scales in all stages of development are killed.

EXAMPLE 19

A spraying agent having the composition described in Example 18 applied at a concentration of 0.4% is also suitable for combating scales (Diaspinae), for example *Aspidictus hederae,* and wool-lice (Coccinae), for example *Pseudococcus citri.*

EXAMPLE 20

A spraying agent having the composition described in Example 14 and applied at a concentration of 1% is effective against thrips (larvae—nymphs—imagines) when infested plants, for example, tobacco plants are sprayed therewith.

EXAMPLE 21

A preparation having the composition described in Example 15, except that it contains 25% of the trimethylacetic acid ester of 4,6-dinitro-2-sec.-butylphenol instead of the dimethylacrylic acid ester, is effective against plant-lice, for example, of the genus *Doralis fabae* when applied to the host plants, for instance *Vicia faba,* at a concentration of 0.1%.

EXAMPLE 22

Bean plants infested with spider mites (Tetranychidae) are sprayed with an aqueous liquor of an emulsifiable concentrate containing 15% of the adipic acid di-ester of 4,6-dinitro-2-sec.-butylphenol, 75% cyclohexanone and 10% of oxethylated nonylphenol as emulsifier. The mites and also the greater part of the eggs are destroyed. Those larvae that subsequently hatch out soon die after coming into contact with the substance that remained on various parts of the plant.

We claim:

1. A compound selected from the group consisting of

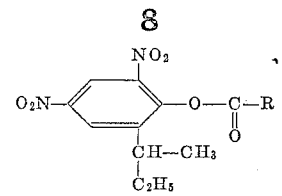

and

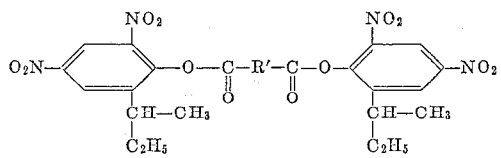

in which R stands for a monovalent radical selected from the group consisting of saturated, unsaturated and halogen-substituted aliphatic hydrocarbon radicals, saturated, unsaturated and halogensubstituted cycloaliphatic hydrocarbon radicals, alkoxy radicals containing 1 to 4 carbon atoms, and the phenyl radical, and R' stands for a bivalent radical selected from the group consisting of aliphatic hydrocarbon radicals and the phenylene radical.

2. The acetic acid ester of 4,6-dinitro-2-sec.-butylphenol.
3. The chloracetic acid ester of 4,6-dinitro-2-sec.-butylphenol.
4. The propionic acid ester of 4,6-dinitro-2-sec.-butylphenol.
5. The butyric acid ester of 4,6-dinitro-2-sec.-butylphenol.
6. The trimethylacetic acid ester of 4,6-dinitro-2-sec.-butylphenol.
7. The isobutyric acid ester of 4,6-dinitro-2-sec.-butylphenol.
8. The β,β-dimethylacrylic acid ester of 4,6-dinitro-2-sec.-butylphenol.
9. The β,β-methyl-n-propylacrylic acid ester of 4,6-dinitro-2-sec.-butylphenol.
10. The sorbic acid ester of 4,6-dinitro-2-sec.-butylphenol.
11. The oleic acid ester of 4,6-dinitro-2-sec.-butylphenol.
12. The lauric acid ester of 4,6-dinitro-2-sec.-butylphenol.
13. The adipic acid ester of 4,6-dinitro-2-sec.-butylphenol.
14. The benzoic acid ester of 4,6-dinitro-2-sec.-butylphenol.
15. The hexahydrobenzoic acid ester of 4,6-dinitro-2-sec.-butylphenol.
16. The ortho-phthalic acid ester of 4,6-dinitro-2-sec.-butylphenol.
17. The hexachlorendomethylentetrahydrobenzoic acid ester of 4,6-dinitro-2-sec.-butylphenol.
18. Pesticides, consisting of an ester of 4,6-dinitro-2-sec.-butylphenol as claimed in claim 1 and a carrier selected from the group consisting of solid and liquid diluents.
19. Process for combating pests, wherein a 4,6-dinitro-2-sec.-butylphenol ester according to claim 1 is applied in an amount which is sufficient to kill the pests.

References Cited in the file of this patent

UNITED STATES PATENTS

| | | |
|---|---|---|
| 2,369,137 | Coleman | Feb. 13, 1945 |
| 2,499,396 | Lynn | Mar. 7, 1950 |
| 2,807,639 | Rickert | Sept. 24, 1957 |
| 2,861,915 | Cary | Nov. 25, 1958 |
| 2,880,231 | Freedman | Mar. 31, 1959 |

OTHER REFERENCES

King: "Chemicals Evaluated as Insecticides," U.S. Dept. Agr. Handbook No. 69, pages 1–18, 123, 259–260.